US012439232B2

(12) United States Patent
Tsuge

(10) Patent No.: US 12,439,232 B2
(45) Date of Patent: Oct. 7, 2025

(54) VEHICLE WITH EMERGENCY REPORTING FUNCTION

(71) Applicant: SUBARU CORPORATION, Tokyo (JP)

(72) Inventor: Masatoshi Tsuge, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 645 days.

(21) Appl. No.: 17/855,258

(22) Filed: Jun. 30, 2022

(65) Prior Publication Data

US 2023/0021599 A1 Jan. 26, 2023

(30) Foreign Application Priority Data

Jul. 21, 2021 (JP) ................................ 2021-120769

(51) Int. Cl.
*H04W 4/90* (2018.01)
(52) U.S. Cl.
CPC ..................................... *H04W 4/90* (2018.02)
(58) Field of Classification Search
CPC .................................. H04W 4/90; H04W 4/44
See application file for complete search history.

(56) References Cited

U.S. PATENT DOCUMENTS

2002/0195490 A1* 12/2002 Gehlot .................... B60R 13/10
235/384
2009/0099732 A1* 4/2009 Pisz ........................ G08G 1/205
701/45
2015/0134142 A1* 5/2015 Taylor .................... B60L 3/0046
701/1
2018/0029553 A1 2/2018 Hamakami
2022/0157449 A1* 5/2022 Salter ...................... G16H 50/20
2024/0273632 A1* 8/2024 Espel-Logan ............ B60Q 9/00

FOREIGN PATENT DOCUMENTS

JP 11-219488 A 8/1999
JP H11-355478 A 12/1999
JP 2001-202579 A 7/2001

(Continued)

OTHER PUBLICATIONS

Office Action dated Jul. 1, 2025 from corresponding Japanese Application No. 2021-120769, 8 pages.

*Primary Examiner* — Barry W Taylor
(74) *Attorney, Agent, or Firm* — Rimon P.C.

(57) ABSTRACT

A vehicle with an emergency reporting function includes a communicator, a memory, a user interface, and a processor. The communicator transmits an emergency report to an operator terminal if the vehicle is involved in an emergency. The memory holds information on injury inquiry items for inquiry about injury to an occupant. The user interface is provided in the vehicle and used by the occupant of the vehicle. The processor controls the vehicle to cause the communicator to transmit the emergency report to the operator terminal if the vehicle is involved in the emergency. In the case where the vehicle is involved in the emergency, the processor inquires of the occupant about the injury inquiry items held in the memory, via the user interface, and causes the communicator to automatically transmit, to the operator terminal, an inquiry result of the injury to the occupant after the occurrence of the emergency.

12 Claims, 5 Drawing Sheets

(56) References Cited

FOREIGN PATENT DOCUMENTS

| | | | |
|---|---|---|---|
| JP | 2001-222783 | A | 8/2001 |
| JP | 2010-244167 | A | 10/2010 |
| JP | 2015-018516 | A | 1/2015 |
| JP | 2015-161977 | A | 9/2015 |
| JP | 2015-176566 | A | 10/2015 |
| WO | 2016/170610 | A1 | 10/2016 |
| WO | 2020/059257 | A1 | 3/2020 |

\* cited by examiner

| INQUIRY SCREEN | OPERATION INFORMATION FOR EACH INJURY INQUIRY ITEM | | |
|---|---|---|---|
| | FULL INPUT SCREEN (UPON MANUAL REPORTING) | PARTIAL INPUT SCREEN | MINIMUM INPUT SCREEN |
| INQUIRY SCREEN FOR PRESENCE OR ABSENCE OF INJURY | INJURED BUTTON | INJURED BUTTON | INJURED BUTTON |
| | UNINJURED BUTTON | UNINJURED BUTTON | UNINJURED BUTTON |
| INQUIRY SCREEN FOR INJURED PLACE | HEAD BUTTON | HEAD BUTTON | HEAD BUTTON |
| | BODY BUTTON | BODY BUTTON | BODY BUTTON |
| | RIGHT ARM BUTTON | LIMB BUTTON | LIMB BUTTON |
| | LEFT ARM BUTTON | | |
| | RIGHT LEG BUTTON | | |
| | LEFT LEG BUTTON | | |
| INQUIRY SCREEN FOR DEGREE OF INJURY | SEVERE BLEEDING BUTTON | BLEEDING BUTTON | BLEEDING BUTTON |
| | MODERATE BLEEDING BUTTON | | |
| | MINOR BLEEDING BUTTON | | |
| | NO BLEEDING BUTTON | NO BLEEDING BUTTON | NO BLEEDING BUTTON |
| INQUIRY SCREEN FOR NUMBER OF INJURED | ONE PERSON BUTTON | ONE PERSON BUTTON | ONE PERSON BUTTON |
| | TWO PEOPLE BUTTON | TWO OR MORE PEOPLE BUTTON | TWO OR MORE PEOPLE BUTTON |
| | THREE PEOPLE BUTTON | | |
| | FOUR PEOPLE BUTTON | | |
| | FIVE PEOPLE BUTTON | | |
| INQUIRY SCREEN FOR CHRONIC DISEASE AND MEDICAL HISTORY | TEXT INPUT BOX | CHRONIC DISEASE PRESENCE BUTTON | NO SCREEN DISPLAY |
| | | CHRONIC DISEASE ABSENCE BUTTON | |
| INQUIRY SCREEN FOR PRESENCE OR ABSENCE OF RESCUER | RESCUER PRESENCE BUTTON | NO SCREEN DISPLAY | NO SCREEN DISPLAY |
| | RESCUER ABSENCE BUTTON | | |

FIG. 6

VEHICLE WITH EMERGENCY REPORTING FUNCTION

CROSS-REFERENCE TO RELATED APPLICATIONS

The present application claims priority from Japanese Patent Application No. 2021-120769 filed on Jul. 21, 2021, the entire contents of which are hereby incorporated by reference.

BACKGROUND

The technology relates to a vehicle with an emergency reporting function.

A vehicle, such as an automobile, can come into collision with another automobile while traveling, or an occupant of the automobile can feel sick. In this case, the automobile makes an emergency report to an operator of an emergency support center. For example, reference is made to Japanese Unexamined Patent Application Publication No. H11-219488 and International Publication No. WO 2016/170610.

In response to an emergency report, the operator of the emergency support center makes a dispatch request of a dispatch team. The dispatch team rushes to a site where the automobile that has made the emergency report is present by an emergency vehicle, for example, to execute an emergency response.

This enables the automobile and the occupant involved in an emergency to receive the emergency response.

SUMMARY

An aspect of the technology provides a vehicle with an emergency reporting function. The vehicle includes a communicator, a memory, a user interface, and a processor. The communicator is configured to transmit an emergency report to an operator terminal in a case where the vehicle is involved in an emergency. The memory is configured to hold information on injury inquiry items for inquiry about injury to an occupant of the vehicle. The user interface is provided in the vehicle and to be used by the occupant of the vehicle. The processor is configured to control the vehicle to cause the communicator to transmit the emergency report to the operator terminal in the case where the vehicle is involved in the emergency. The processor is configured to, in the case where the vehicle is involved in the emergency, inquire of the occupant about the injury inquiry items held in the memory, via the user interface, and cause the communicator to automatically transmit, to the operator terminal, an inquiry result of the injury to the occupant.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 6 is an explanatory diagram illustrating display contents of inquiry screens for a plurality of injury inquiry items that are displayed on a vehicle display device in the emergency reporting control for the automobile illustrated in FIG. 5.

DETAILED DESCRIPTION

In an emergency response, it is desired to take an action or a measure corresponding to details of an emergency. In a case where emergency response personnel finds a shortage of equipment, for example, after arriving at a site, it is difficult for the emergency response personnel who has rushed to the site to immediately start the emergency response.

For a more appropriate emergency response, it is thus desired that, before making a dispatch request of a dispatch team, an operator of an emergency support center inquire, by phone, about details and a degree of an emergency of an occupant of an automobile from which an emergency report has been received.

However, even if it is possible to inquire about details of an emergency by such inquiry by phone, it is impractical to inquire about further details under a situation demanding an emergency response. For example, it is impractical to inquire about a medical history, for example, of the occupant of the automobile involved in the emergency in an emergency phone call. In addition, in a case where the occupant is unconscious, it is difficult to inquire of the occupant by phone.

It is desirable to provide a vehicle with an emergency reporting function that allows for a more appropriate emergency response.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
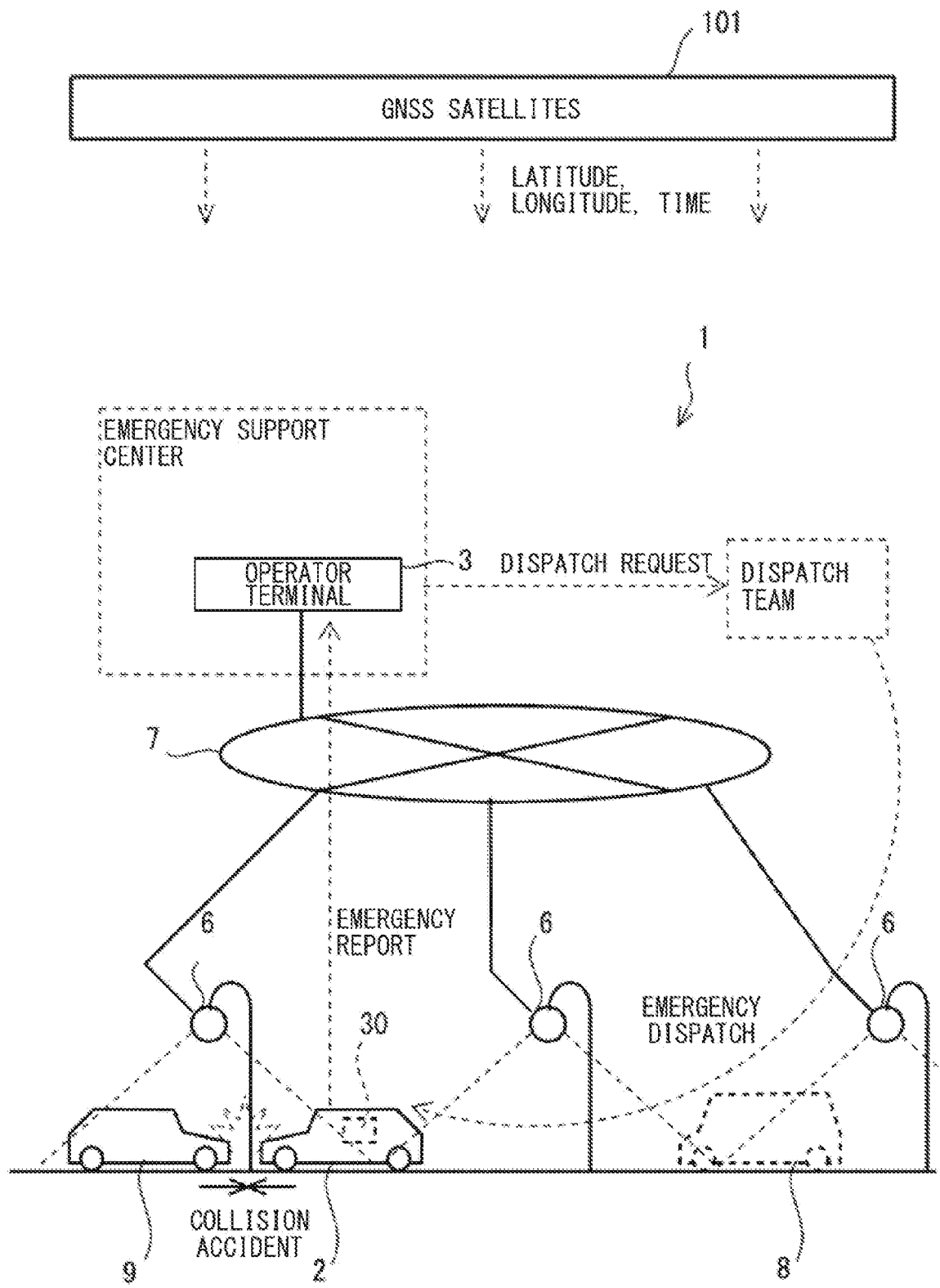
FIG. 1 is an explanatory diagram illustrating an automatic emergency reporting system for an automobile, according to one example embodiment of the technology.

FIG. 1 is an explanatory diagram illustrating an automatic emergency reporting system 1 for an automobile 2, according to an example embodiment of the technology.

The automatic emergency reporting system 1 illustrated in FIG. 1 may include the automobile 2 supporting the system, and an operator terminal 3 of an emergency support center. Note that the emergency support center may be provided with an unillustrated server accessible by the operator terminal 3, together with the operator terminal 3.

The automobile 2 is an example of a vehicle that is able to travel while carrying an occupant. A control system 30 of the automobile 2 may establish, via a mobile communicator 33 to be described later, a communication path with a base station 6 among a plurality of base stations 6. The base station 6 may include, in its zone, a road on which the automobile 2 travels. The plurality of base stations 6 may be coupled to a communication network 7. The base station 6 and the communication network 7 may be a base station and a communication network for a next-generation communication network, such as 5G communication network, provided by a carrier. In another example, the base station 6 and the communication network 7 may be a base station and a communication network for an advanced driver assistance system (ADAS) provided by, for example, a public institution.

The operator terminal 3 may be coupled to the communication network 7 via a communication device 17 to be described later.

The automobile 2 can come into collision with another automobile 9 while traveling, or an occupant, such as an owner who drives the automobile 2, can feel sick. In a case where the automobile 2 is thus involved in an emergency, the control system 30 of the automobile 2 may make an emergency report to the operator terminal 3 of the emergency support center from the mobile communicator 33 to be described later, through the base station 6 and the communication network 7, for example, in response to a manual operation.

An operator of the emergency support center may check the emergency report received by the operator terminal 3, and make a dispatch request of a dispatch team. The dispatch team may rush to a site where the automobile 2 that has made the emergency report is present, by an emergency vehicle 8, to execute an emergency response.

This enables the automobile 2 and the occupant involved in the emergency to receive the emergency response executed by the dispatch team.

In an emergency response, it is desired to take an action or a measure corresponding to details of an emergency. For example, if a shortage of equipment occurs after arriving at a site, emergency response personnel has to wait for preparation of the equipment. This makes it difficult for the emergency response personnel that has rushed to the site to start the emergency response immediately after arriving at the site.

For a more appropriate emergency response, it may thus be desired that, before making a dispatch request of a dispatch team, the operator of the emergency support center talk by phone with the occupant of the automobile 2 from which an emergency report has been received, to grasp details and a degree of an emergency in advance.

However, even if the operator is able to inquire about details of an emergency by phone, it is impractical to inquire about further details under a situation demanding an emergency response. For example, the operator is not always able to inquire about a medical history of the occupant of the automobile 2 involved in an emergency in each emergency phone call. In addition, even if the operator places a phone call, an occupant who has lost consciousness due to an accident, for example, is unable to respond to the phone call.

As described above, it may be desired that the automatic emergency reporting system 1 be improved to allow for a more appropriate emergency response.

Figure 2:
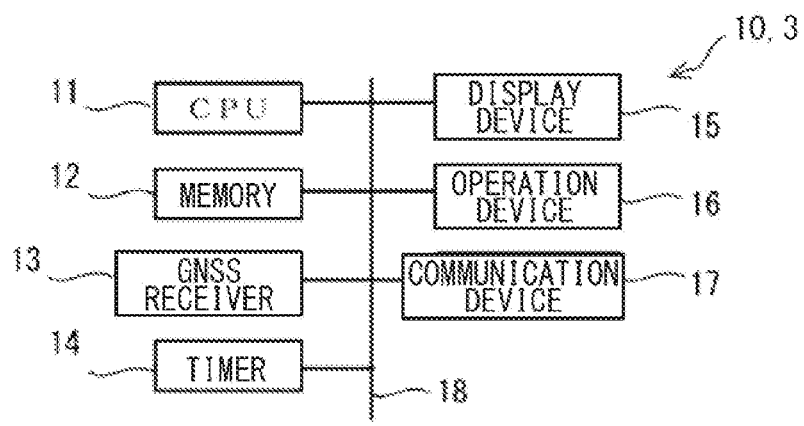
FIG. 2 is an explanatory diagram illustrating a computer that may be used as an operator terminal illustrated in FIG. 1.

FIG. 2 is an explanatory diagram illustrating a computer 10 that may be used as the operator terminal 3 illustrated in FIG. 1.

The computer 10 illustrated in FIG. 2 may include a central processing unit (CPU) 11, a memory 12, a global navigation satellite system (GNSS) receiver 13, a timer 14, a display device 15, an operation device 16, the communication device 17, and a computer network 18 that couples these components. The computer 10 may further include an unillustrated microphone and an unillustrated speaker to be used for a phone call.

The communication device 17 may be coupled to the communication network 7. The communication device 17 may further be coupled to a local area network. The communication device 17 may transmit and receive communication data of the computer 10.

The display device 15 may be a liquid crystal monitor, for example. The display device 15 may display a screen for the operator. Non-limiting examples of the display screen of the display device 15 may include an emergency report screen, a phone call screen, and a dispatch request screen.

The emergency report screen may be a screen that displays, for example, presence or absence of an emergency report and details of the emergency report. Non-limiting examples of the details of the emergency report may include a site, i.e., a position of the automobile 2 that has made the emergency report, a report time, and a reported or predicted state about the automobile 2 and the occupant. Presence or absence of another emergency report issued near the automobile 2 may also be displayed, for example. The phone call screen may be, for example, an outgoing call screen for the automobile 2 from which the emergency report has been received or a mobile terminal of the occupant thereof.

The dispatch request screen may be a request screen for a dispatch team present near the site where an emergency has occurred.

The operation device 16 may be a keyboard, a pointing device, a touch panel, or a button, for example. The operation device 16 may be operated by the operator. The operator may operate the operation device 16 to, for example, switch the display screen of the display device 15.

The GNSS receiver 13 may receive radio waves from GNSS satellites 101 illustrated in FIG. 1, and generate a current time. The GNSS receiver 13 may obtain a position where the computer 10 is installed, together with the current time.

The timer 14 may measure a time period or a time. The time of the timer 14 may be calibrated by the current time of the GNSS receiver 13.

The memory 12 may hold a program and data to be used to cause the computer 10 to serve as the operator terminal 3.

The CPU 11 may read the program from the memory 12 and execute the program. This enables the CPU 11 to serve as a processor that controls overall operation of the operator terminal 3.

The CPU 11 serving as the processor of the operator terminal 3 may receive an emergency report from the automobile 2, switch the display of the display device 15 in response to the operator's operation, and execute control based on an operation on the display screen. Non-limiting examples of the control based on the operation on the display screen may include control of an outgoing call to the automobile 2 that has made the emergency report or the occupant thereof, and control of an outgoing call to a dispatch team for a dispatch request.

Figure 3:
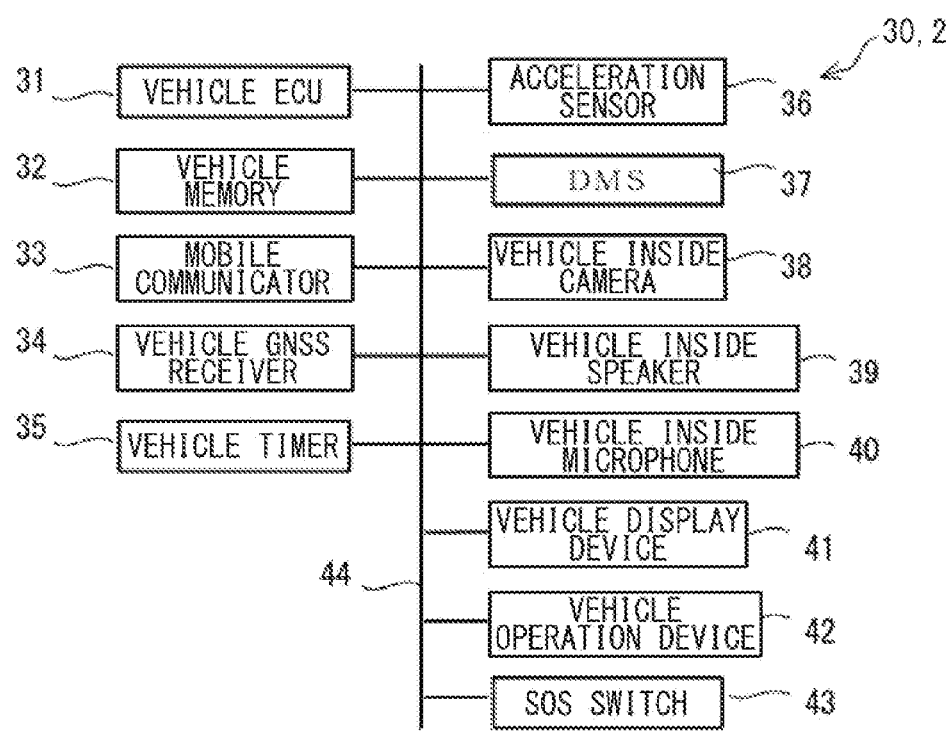
FIG. 3 is an explanatory diagram illustrating a control system of the automobile illustrated in FIG. 1.

FIG. 3 is an explanatory diagram illustrating the control system 30 of the automobile 2 illustrated in FIG. 1.

The control system 30 of the automobile 2 illustrated in FIG. 3 may include a vehicle electronic control unit (ECU) 31, a vehicle memory 32, the mobile communicator 33, a vehicle GNSS receiver 34, a vehicle timer 35, an acceleration sensor 36, an occupant monitoring device (e.g., a driver monitoring system (DMS)) 37, a vehicle inside camera 38, a vehicle inside speaker 39, a vehicle inside microphone 40, a vehicle display device 41, a vehicle operation device 42, a SOS switch 43, and a vehicle network 44 that couple these components. The SOS switch 43 may be operated by the occupant in emergency.

The vehicle network 44 may be a wired communication network conforming to a controller area network (CAN) or a local interconnect network (LIN), for example, for the automobile 2. The vehicle network 44 may be a communication network such as a local area network (LAN), or may be a combination of such communication networks. The vehicle network 44 may partly include a wireless communication network.

The vehicle GNSS receiver 34, the vehicle timer 35, the vehicle display device 41, the vehicle operation device 42, the vehicle inside speaker 39, and the vehicle inside microphone 40 may be similar to the corresponding components of the computer 10 illustrated in FIG. 2. Note that the vehicle operation device 42 may be, for example, a touch panel that is overlayed on the vehicle display device 41. The vehicle display device 41 may display, for example, a situation of automatic driving of the automobile 2 and an emergency report screen.

The vehicle display device 41 and the vehicle operation device 42 may be provided on a dashboard or a center console, for example, inside the automobile 2. In one embodiment, the vehicle display device 41 and the vehicle operation device 42 may serve as a "user interface" provided in the automobile 2 to be used by the occupant of the automobile 2. In a case where the vehicle display device 41 is a liquid crystal device, the vehicle operation device 42 may be a touch panel that is overlaid on the liquid crystal device. The vehicle inside speaker 39 and the vehicle inside microphone 40 may also serve as the user interface.

The mobile communicator 33 may establish a communication path with the base station 6. The mobile communicator 33 may transmit and receive data to and from the communication device 17 of the operator terminal 3, through the base station 6 and the communication network 7, as a communicator of the automobile 2. In a case where the automobile 2 is involved in an emergency, the mobile communicator 33 automatically transmits an emergency report to the operator terminal 3. In one embodiment, the mobile communicator 33 may serve as a "communicator".

The acceleration sensor 36 may detect an acceleration of the automobile 2. The acceleration sensor 36 may detect a speed of the automobile 2. A sudden stop or collision of the automobile 2 causes an acceleration higher than a usual acceleration.

The vehicle inside camera 38 may capture an image of a vehicle compartment of the automobile 2. The vehicle inside camera 38 may capture an image of only the owner of the automobile 2 or an image of the entire vehicle compartment.

The occupant monitoring device 37 may identify the owner and a passenger riding the automobile 2 and monitor a state of each occupant, on the basis of the image captured by the vehicle inside camera 38. The occupant can doze, look aside, or have an abnormal heart rate. The occupant monitoring device 37 may detect an abnormality about a health state of the occupant on the basis of, for example, the abnormal heart rate.

The SOS switch 43 may be an independent physical button provided on a steering wheel or a shift knob, for example, inside the automobile 2. The SOS switch 43 may be operated by the occupant in emergency. The SOS switch 43 may accordingly be provided at a position easy for the occupant to operate. Non-limiting examples of the occupant may include a driver who drives the automobile 2. The SOS switch 43 may be provided with a part such as a button cover to suppress an unintended erroneous operation. In one embodiment, the SOS switch 43 may serve as an "emergency reporting switch" to be manually operated by the occupant of the automobile 2 in an emergency.

The vehicle memory 32 may hold a program and data.

The vehicle memory 32 may hold operation information for a plurality of injury inquiry items for inquiry about injury to the occupant of the automobile 2 in an emergency of the automobile 2. In one embodiment, the vehicle memory 32 may serve as a "memory".

The operation information held in the vehicle memory 32 may be setting information of a text input box and a selection button for an inquiry screen that is displayed on the vehicle display device 41 to inquire about the state of the occupant. A plurality of selection buttons and a text input box may be displayed on the inquiry screen on the basis of the setting.

The operation information may be held in the vehicle memory 32 by being organized for each inquiry screen of the vehicle display device 41.

The vehicle ECU 31 may read the program from the vehicle memory 32 and execute the program. This enables the vehicle ECU 31 to serve as a processor that controls overall operation, including travel control, of the automobile 2.

The vehicle ECU 31 serving as the processor of the automobile 2 may control travel of the automobile 2 based on the automatic driving, for example.

Collision can be detected by a detection value of the acceleration sensor 36 exceeding a threshold, or an abnormality or irregularity in the health state of the occupant can be detected by the occupant monitoring device 37, for example. In such a case, the vehicle ECU 31 may determine that an emergency has occurred.

The vehicle ECU 31 may execute emergency reporting control. In a case where an emergency has occurred, the vehicle ECU 31 controls the automobile 2 to transmit an emergency report, for example, from the mobile communicator 33 to the operator terminal 3.

Figure 4:
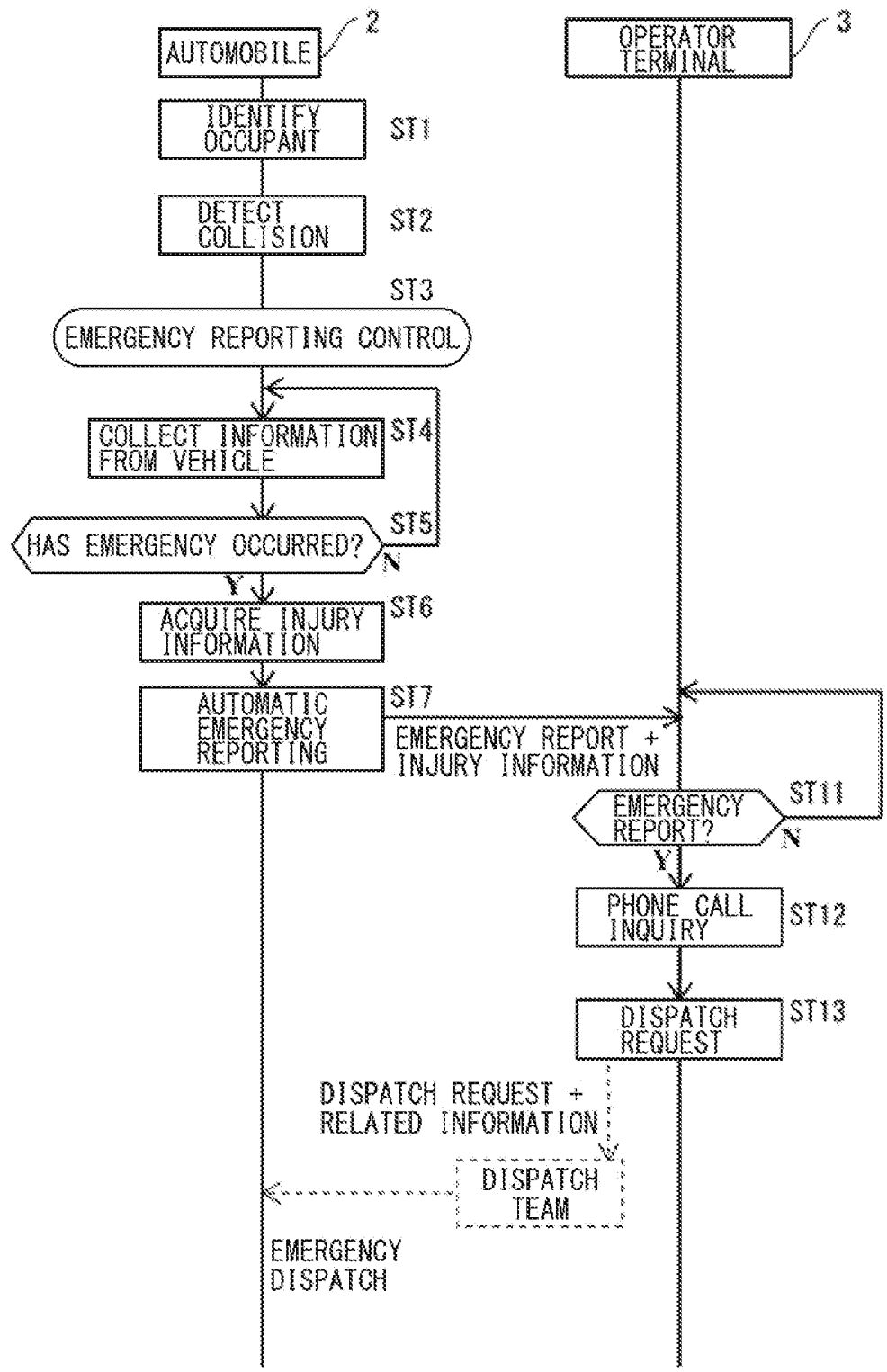
FIG. 4 is a timing chart illustrating an example flow of automatic emergency reporting in the entire automatic emergency reporting system illustrated in FIG. 1.

FIG. 4 is a timing chart illustrating an example flow of automatic emergency reporting in the entire automatic emergency reporting system 1 illustrated in FIG. 1.

FIG. 4 illustrates the automobile 2 and the operator terminal 3. Time flows from the top to the bottom.

FIG. 4 illustrates an example of emergency reporting in a case of collision of the automobile 2. Reporting in another emergency, such as sudden illness of the occupant, may be similar to the reporting in FIG. 4.

In step ST1, the vehicle ECU 31 of the automobile 2 may identify the occupant riding the automobile 2. The vehicle ECU 31 may identify the riding occupant by means of, for example, the occupant monitoring device 37.

In step ST2, the vehicle ECU 31 of the automobile 2 may detect collision of the automobile 2. The vehicle ECU 31 may detect the collision of the automobile 2, for example, if the detection value of the acceleration sensor 36 exceeds the threshold. The vehicle ECU 31 may detect the collision of the automobile 2 by predicting unavoidable collision of the automobile 2.

In step ST3, the vehicle ECU 31 of the automobile 2 may start the emergency reporting control on the basis of the detection of the collision of the automobile 2.

In step ST4, the vehicle ECU 31 of the automobile 2 may collect information from the automobile 2. The vehicle ECU 31 may collect information about the state of the occupant after the collision detection, for example, by means of the occupant monitoring device 37. The occupant can be hurt or injured by the collision or can be unconscious.

In step ST5, the vehicle ECU 31 of the automobile 2 may determine whether an emergency for which an emergency report is to be made has occurred. The vehicle ECU 31 may determine whether an emergency for which an emergency report is to be made has occurred, for example, on the basis of a degree of impact applied by the collision, or presence or absence of consciousness or a motion of the occupant, such as the owner. If an emergency for which an emergency report is to be made has occurred (ST5: Y), the vehicle ECU 31 may cause the flow to proceed to step ST6. If an emergency for which an emergency report is to be made has not occurred (ST5: N), the vehicle ECU 31 may cause the flow to return to step ST4. This enables the vehicle ECU 31 to keep monitoring about the state after the collision detection. The vehicle ECU 31 may end this control, without causing the flow to return to step ST4, after elapse of a predetermined period.

In step ST6, the vehicle ECU 31 of the automobile 2 may acquire injury information about the occupant after the occurrence of the emergency.

In step ST7, the vehicle ECU 31 of the automobile 2 may transmit, to the operator terminal 3 via the mobile communicator 33, an emergency report indicating that the automobile 2 is involved in the emergency due to an accident, and the injury information of the occupant after the occurrence of the emergency.

In step ST11, the CPU 11 of the operator terminal 3 may determine whether an emergency report has been received. The operator terminal 3 may receive the emergency report transmitted by the vehicle ECU 31 of the automobile 2 in step ST7. If no emergency report has been received (ST11: N), the CPU 11 of the operator terminal 3 may repeat this process. If an emergency report is received (ST11: Y), the CPU 11 of the operator terminal 3 may cause the flow to proceed to step ST12.

In step ST12, the CPU 11 of the operator terminal 3 may place a phone call to the automobile 2 from which the emergency report has been received or the occupant thereof, to inquire about the state of the occupant.

Note that the operator terminal 3 may have already received, together with the emergency report, the injury information of the occupant after the occurrence of the emergency. In a case where an operation of placing a phone call is performed by the operator who has checked this information, the operator terminal 3 may make the phone call inquiry of the occupant in step ST12.

The operator is able to inquire, by phone, about a damage state of the automobile 2 and a detailed state of the occupant, of the automobile 2 or the occupant with which connection is established by the phone call placed by the operator terminal 3. The operator may have checked the basic injury information of the occupant after the occurrence of the emergency, already received by the operator terminal 3. This enables the operator to inquire about the detailed state in short time in a state of having roughly grasped an injury state of the occupant.

In step ST13, the CPU 11 of the operator terminal 3 may output, on the basis of the operator's operation on the operation device 16, a dispatch request to the dispatch team determined as being the most suitable on the basis of, for example, related information.

In response to the dispatch request, the dispatch team may rush to a location of the automobile 2 from which the emergency report has been received, with the emergency report and the related information, and execute emergency response rescue work, for example. The dispatch team is able to execute more accurate rescue work on the basis of the information on the medical history and received medication of the owner.

Figure 5:
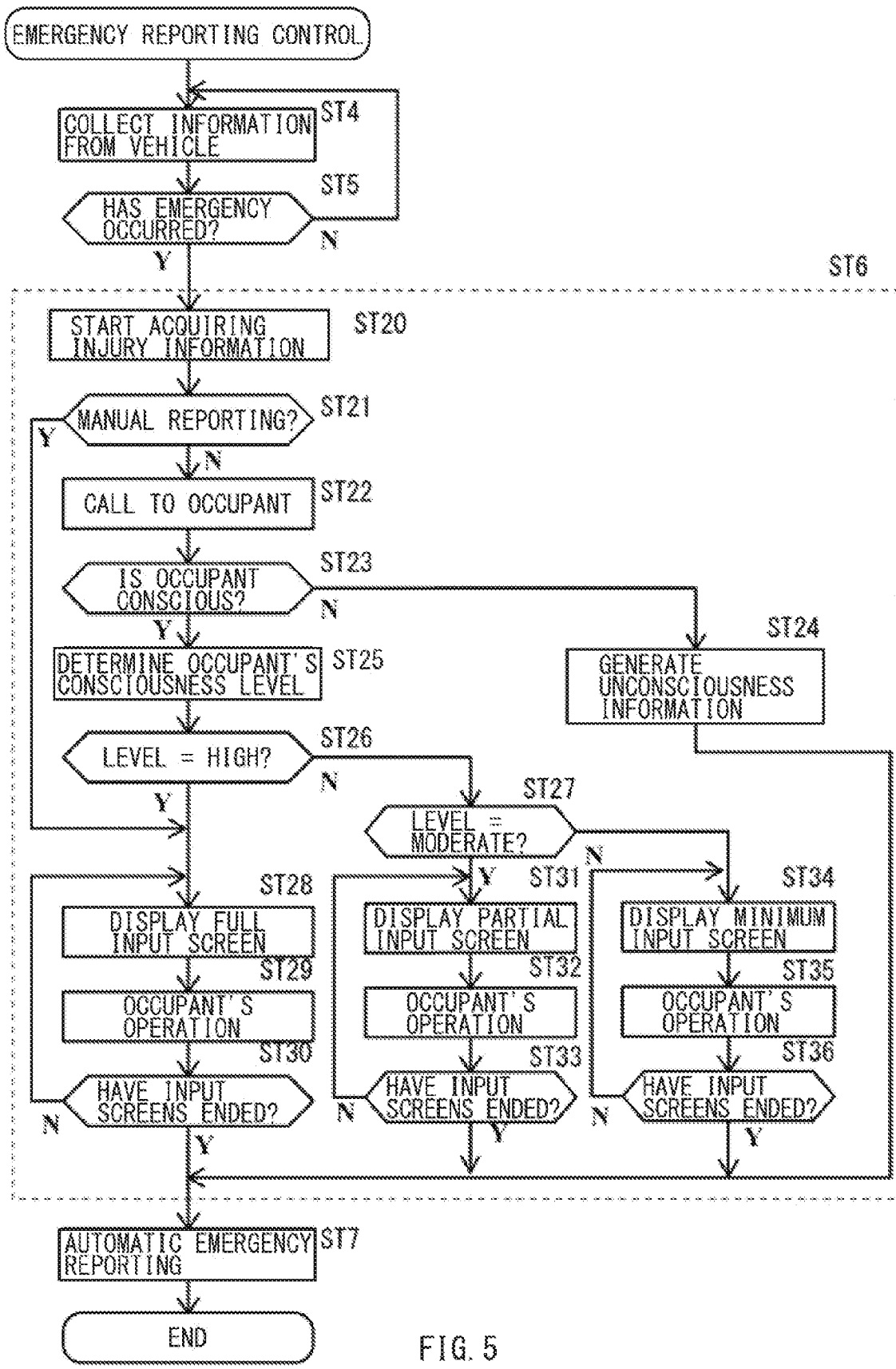
FIG. 5 is a flowchart illustrating an example of emergency reporting control for the automobile, available for the automatic emergency reporting illustrated in FIG. 4.

FIG. 5 is a flowchart illustrating an example of the emergency reporting control for the automobile 2, available for the automatic emergency reporting illustrated in FIG. 4.

The vehicle ECU 31 of the automobile 2 may repeatedly execute the emergency reporting control illustrated in FIG. 5, for example, for the emergency reporting illustrated in FIG. 4.

In FIG. 5, an example processing flow from step ST4 through step ST7 may be similar to that in FIG. 4. In FIG. 5, after step ST5, the vehicle ECU 31 may cause the flow to proceed to step ST20 for the process of step ST6.

In step ST20, the vehicle ECU 31 may start acquiring the injury information about the occupant of the automobile 2 involved in an emergency for which an emergency report is to be made.

In step ST21, the vehicle ECU 31 may determine whether emergency has been reported by a manual operation of the occupant.

For example, in a case where the SOS switch 43 is manually operated by the occupant, the vehicle ECU 31 may determine that an emergency has occurred, assuming that the occupant has suffered bodily injury due to sudden illness, for example. In this case (ST21: Y), the vehicle ECU 31 may determine that emergency has been reported by a manual operation of the occupant, and cause the flow to proceed to step ST28. In step ST28 to step ST30, the vehicle ECU 31 may check the occupant's operation, after the occurrence of the emergency, performed on the operation information for the plurality of injury inquiry items held in the vehicle memory 32, as will be described later. The same applies to step ST31 to step ST33 and step ST34 to step ST36.

In another example, in a case where the detection value of the acceleration sensor 36 is greater than a threshold for determination of a minor collision accident, the vehicle ECU 31 may determine that an emergency has occurred. In this case (ST21: N), the vehicle ECU 31 may determine that emergency has not been reported by a manual operation of the occupant, and cause the flow to proceed to step ST22.

In step ST22, the vehicle ECU 31 may call to the occupant of the automobile 2 that is to make the emergency report. For example, the vehicle ECU 31 may output calling voice to the occupant from the vehicle inside speaker 39, and monitor response voice of the occupant via the vehicle inside microphone 40.

In step ST23, the vehicle ECU 31 may determine whether the occupant of the automobile 2 that is to make the emergency report is conscious. For example, if no response to the calling in step ST22 is recognized (ST23: N), the vehicle ECU 31 may determine that the occupant of the automobile 2 that is to make the emergency report is unconscious, and cause the flow to proceed to step ST24. If a response to the calling in step ST22 is recognized (ST23: Y), the vehicle ECU 31 may determine that the occupant of the automobile 2 that is to make the emergency report is conscious, and cause the flow to proceed to step ST25.

In step ST24, the vehicle ECU 31 may generate unconsciousness information indicating that the occupant is unconscious. Thereafter, the vehicle ECU 31 may cause the flow to proceed to step ST7, and execute the automatic emergency reporting. The vehicle ECU 31 may cause the mobile communicator 33 to automatically transmit the unconsciousness information, together with an emergency report, to the operator terminal 3. Thereafter, the vehicle ECU 31 may end this control. In this case, the operator terminal 3 is able to recognize that the occupant is unconscious, before placing a phone call in step ST12 of FIG. 4. This enables the operator to make the dispatch request in step ST13 of FIG. 4 early, without making the phone call inquiry in step ST12 of FIG. 4.

In step ST25, the vehicle ECU 31 may determine a consciousness level of the occupant after the occurrence of the emergency.

The vehicle ECU 31 may determine whether the consciousness level of the occupant is high, moderate, or low on the basis of, for example, a voice characteristic of the response to the calling in step ST22. For example, the determination may be made on the basis of whether the voice has clear intonation and phoneme, whether a speech speed is high or low, or whether an interval between phonemes is wide or narrow. A decrease in the consciousness level tends to result in unclear intonation and phoneme, a low speech speed, and a wide interval between phonemes. The vehicle ECU 31 may convert any of these into a value, for example, and compare the value with a consciousness level threshold. The vehicle ECU 31 may thus determine the presence or absence of consciousness and the consciousness level of the occupant after the occurrence of the emergency of the automobile 2, in a case where the emergency of the automobile 2 is based on an event other than a manual operation.

In another example, the vehicle ECU 31 may determine whether the consciousness level of the occupant is high, moderate, or low on the basis of response time for a simple question, i.e., elapsed time from a calling timing to a response timing.

In another example, the vehicle ECU 31 may determine whether the consciousness level of the occupant is high, moderate, or low by combining the plurality of kinds of determination criteria described above.

In step ST26, the vehicle ECU 31 may determine whether the consciousness level of the occupant determined in step ST25 is a high level at which the occupant is sufficiently conscious. If the consciousness level of the occupant is high (ST26: Y), the vehicle ECU 31 may cause the flow to proceed to step ST28. If the consciousness level of the occupant is not high (ST26: N), the vehicle ECU 31 may cause the flow to proceed to step ST27.

In step ST27, the vehicle ECU 31 may determine whether the consciousness level of the occupant determined in step ST25 is a moderate consciousness level at which the occupant is not sufficiently conscious but is able to respond. If the consciousness level of the occupant is moderate (ST27: Y), the vehicle ECU 31 may cause the flow to proceed to step ST31. If the consciousness level of the occupant is not moderate, i.e., is low (ST27: N), the vehicle ECU 31 may cause the flow to proceed to step ST34.

Step ST28 may be executed in a case where the emergency of the automobile 2 is based on a manual operation and in a case where the consciousness level of the occupant is high. The vehicle ECU 31 may display a full input screen, assuming that the consciousness level of the occupant is sufficiently high. The vehicle ECU 31 may generate the full input screen that displays, on the inquiry screen for each injury inquiry item held in the vehicle memory 32, all pieces of the operation information held in the vehicle memory 32 for the injury inquiry item. The vehicle ECU 31 may display the full input screen on the vehicle display device 41. In a case where the operation information includes a text input box, the text input box may be displayed on the inquiry screen.

In step ST29, the vehicle ECU 31 may acquire an input or selection operation of the occupant. The vehicle ECU 31 may acquire the operation performed via the vehicle operation device 42 on the operation information displayed in step ST28. In a case where the text input box is displayed, the occupant may operate the vehicle operation device 42 to input text.

In step ST30, the vehicle ECU 31 may determine whether the input screens to be outputted to the occupant with the high consciousness level to allow for operation input have ended. The vehicle ECU 31 may determine whether the input screens have ended on the basis of whether the operation input has ended for all of the plurality of injury inquiry items held in the vehicle memory 32. If the input screens for all of the plurality of injury inquiry items held in the vehicle memory 32 have not ended (ST30: N), the vehicle ECU 31 may cause the flow to return to step ST28. The vehicle ECU 31 may repeat the process of generating and displaying the full input screen that displays all pieces of the operation information for the unprocessed injury inquiry item held in the vehicle memory 32, and acquiring the occupant's operation. If the input screens for all of the plurality of injury inquiry items held in the vehicle memory 32 end (ST30: Y), the vehicle ECU 31 may cause the flow to proceed to step ST7. In step ST7, the vehicle ECU 31 may cause the mobile communicator 33 to automatically transmit an emergency report to the operator terminal 3. In addition, the vehicle ECU 31 may put together information on the operations performed in step ST29 for the full input screens, and cause the mobile communicator 33 to automatically transmit the information as an inquiry result of the injury to the occupant after the occurrence of the emergency.

Step ST31 may be executed in a case where the consciousness level of the occupant is moderate. The vehicle ECU 31 may display a partial input screen simpler than the full input screen, assuming that the consciousness level of the occupant is moderate, i.e., not sufficient but clear to some extent. The vehicle ECU 31 may generate the partial input screen that displays, on the inquiry screen for each injury inquiry item held in the vehicle memory 32, all pieces of the operation information or a part of the operation information held in the vehicle memory 32 for the injury inquiry item. The vehicle ECU 31 may display the partial input screen on the vehicle display device 41. On the inquiry screen, only a selection button may be displayed as the operation information, and a text input box may not be displayed. The number of selection buttons to be displayed on each inquiry screen for the occupant with the moderate consciousness level may be smaller than the number of selection buttons to be displayed on each inquiry screen for the occupant with the high consciousness level.

In step ST32, the vehicle ECU 31 may acquire a selection operation of the occupant. The vehicle ECU 31 may acquire the operation performed via the vehicle operation device 42 on the operation information displayed in step ST31. The occupant may operate the vehicle operation device 42 to select the selection button displayed on the inquiry screen. Even the occupant whose consciousness level is not high is able to select the selection button.

In step ST33, the vehicle ECU 31 may determine whether the input screens to be outputted to the occupant with the moderate consciousness level to allow for operation input have ended. The number of inquiry screens for the injury inquiry items about which the inquiry is to be made of the occupant with the moderate consciousness level may be smaller than the number of inquiry screens for the injury inquiry items about which the inquiry is to be made of the occupant with the high consciousness level. In this case, the vehicle ECU 31 may determine whether the input screens have ended by determining whether the operation input has ended for a part of the plurality of injury inquiry items held in the vehicle memory 32. If the input screens for all of the plurality of injury inquiry items held for the occupant with the moderate consciousness level in the vehicle memory 32 have not ended (ST33: N), the vehicle ECU 31 may cause the flow to return to step ST31. The vehicle ECU 31 may repeat the process of generating and displaying the partial input screen that displays the operation information for the unprocessed injury inquiry item held in the vehicle memory 32, and acquiring the occupant's operation. If the input screens for all of the plurality of injury inquiry items held for the occupant with the moderate consciousness level in the vehicle memory 32 end (ST33: Y), the vehicle ECU 31 may cause the flow to proceed to step ST7. In step ST7, the vehicle ECU 31 may cause the mobile communicator 33 to automatically transmit an emergency report to the operator terminal 3. In addition, the vehicle ECU 31 may put together information on the operations performed in step ST32 for the partial input screens, and cause the mobile communicator 33 to automatically transmit the information as the inquiry result of the injury to the occupant after the occurrence of the emergency.

Step ST34 may be executed in case where the consciousness level of the occupant is low. The vehicle ECU 31 may display a minimum input screen simpler than the partial input screen to the occupant with the low consciousness level.

The vehicle ECU 31 may generate the minimum input screen that displays, on the inquiry screen for each injury inquiry item held in the vehicle memory 32, all pieces of the operation information or a part of the operation information held in the vehicle memory 32 for the injury inquiry item. The vehicle ECU 31 may display the minimum input screen on the vehicle display device 41. On the inquiry screen, only a selection button may be displayed as the operation information, and a text input box may not be displayed.

The number of selection buttons to be displayed on each inquiry screen for the occupant with the low consciousness level may be smaller than the number of selection buttons to be displayed on each inquiry screen for the occupant with the moderate consciousness level.

In step ST35, the vehicle ECU 31 may acquire a selection operation of the occupant. The vehicle ECU 31 may acquire the operation performed via the vehicle operation device 42 on the operation information displayed in step ST34. The occupant may operate the vehicle operation device 42 to select the selection button displayed on the inquiry screen. Even the occupant with the low consciousness level is able to select the selection button.

In step ST36, the vehicle ECU 31 may determine whether the input screens to be outputted to the occupant with the low consciousness level to allow for operation input have ended. The number of inquiry screens for the injury inquiry items about which the inquiry is to be made of the occupant with the low consciousness level may be smaller than the number of inquiry screens for the injury inquiry items about which the inquiry is to be made of the occupant with the moderate consciousness level. In this case, the vehicle ECU 31 may determine whether the input screens have ended by determining whether the operation input has ended for a part of the plurality of injury inquiry items held in the vehicle memory 32. If the input screens for all of the plurality of injury inquiry items held for the occupant with the low consciousness level in the vehicle memory 32 have not ended (ST36: N), the vehicle ECU 31 may cause the flow to return to step ST34. The vehicle ECU 31 may repeat the process of generating and displaying the minimum input screen that displays the operation information for the unprocessed injury inquiry item held in the vehicle memory 32, and acquiring the occupant's operation. If the input screens for all of the plurality of injury inquiry items held for the occupant with the low consciousness level in the vehicle memory 32 end (ST36: Y), the vehicle ECU 31 may cause the flow to proceed to step ST7. In step ST7, the vehicle ECU 31 may cause the mobile communicator 33 to automatically transmit an emergency report to the operator terminal 3. In addition, the vehicle ECU 31 may put together information on the operations performed in step ST35 for the minimum input screens, and cause the mobile communicator 33 to automatically transmit the information as the inquiry result of the injury to the occupant after the occurrence of the emergency.

Upon occurrence of an emergency of the automobile 2 based on an event other than a manual operation, the vehicle ECU 31 serving as the processor may thus, after the occurrence of the emergency of the automobile 2, inquire of the occupant about the injury inquiry item held in the vehicle memory 32 via the vehicle display device 41 and the vehicle operation device 42 serving as the user interface, before the mobile communicator 33 transmits an emergency report to the operator terminal 3. The vehicle ECU 31 may cause the mobile communicator 33 to automatically transmit the inquiry result of the injury to the occupant after the occurrence of the emergency to the operator terminal 3.

The vehicle ECU 31 may inquire about a part of the plurality of injury inquiry items held in the vehicle memory 32 or about a part of the operation information via the vehicle display device 41 and the vehicle operation device 42 serving as the user interface. The part of the plurality of injury inquiry items or the part of the operation information may be increased or reduced in accordance with the determined presence or absence of consciousness and/or consciousness level of the occupant. The vehicle ECU 31 may make the inquiry by reducing, with a decrease in the determined consciousness level of the occupant of the automobile 2, the number of injury inquiry items or the number of pieces of operation information, e.g., selection buttons, to be presented to be selectable for each injury inquiry item. The number of pieces of operation information, e.g., selection buttons, may be reduced by deleting or integrating a part thereof.

FIG. 6 is an explanatory diagram illustrating display contents of the inquiry screens for the plurality of injury inquiry items that are displayed on the vehicle display device 41 in the emergency reporting control for the automobile 2 illustrated in FIG. 5.

In FIG. 6, a plurality of pieces of operation information for the plurality of injury inquiry items may be classified for each inquiry screen for the injury inquiry item and for each type of inquiry screen. The inquiry screens may include three input screens of the full input screen, the partial input screen, and the minimum input screen. The number and details of injury inquiry items and the number of inquiry screens are not limited to those in FIG. 6.

The plurality of pieces of operation information for the plurality of injury inquiry items illustrated in FIG. 6 may be held in the vehicle memory 32 as table data, for example.

The plurality of pieces of operation information for the plurality of injury inquiry items illustrated in FIG. 6 may be, for example, partly incorporated in a program.

The vehicle memory 32 may thus hold the operation information for the plurality of injury inquiry items about which the inquiry is to be made of the occupant of the automobile 2 in an emergency of the automobile 2 based on a manual operation on the SOS switch 43 serving as the emergency reporting switch.

In this case, in executing step ST28, the vehicle ECU 31 may generate the inquiry screen assigned with the operation information in the first column, i.e., the full input screen, and display the inquiry screen on the vehicle display device 41. The vehicle ECU 31 may repeat the processes of step ST28 to step ST30 to generate, in order, an inquiry screen for presence or absence of injury, an inquiry screen for an injured place, an inquiry screen for a degree of injury, an inquiry screen for the number of injured, an inquiry screen for a chronic disease and a medical history, and an inquiry screen for presence or absence of a rescuer, and display the inquiry screens on the vehicle display device 41. In addition, a text input box for text input of the chronic disease and the medical history may be displayed on the inquiry screen for the chronic disease and the medical history. The vehicle memory 32 may hold the text input box as the operation information for the injury inquiry item in a case where the consciousness level of the occupant of the automobile 2 is high.

In executing step ST31, the vehicle ECU 31 may generate the inquiry screen assigned with the operation information in the second column, i.e., the partial input screen, and display the inquiry screen on the vehicle display device 41. The vehicle ECU 31 may repeat the processes of step ST31 to step ST33 to generate, in order, an inquiry screen for presence or absence of injury, an inquiry screen for an injured place, an inquiry screen for a degree of injury, an inquiry screen for the number of injured, and an inquiry screen for a chronic disease and a medical history, and display the inquiry screens on the vehicle display device 41. The vehicle ECU 31 may refrain from inquiring about the presence or absence of a rescuer by displaying an inquiry screen. In addition, a selection button for inquiry about presence or absence of a chronic disease and a medical history may be displayed on the inquiry screen for the chronic disease and the medical history, as with the other inquiry screens. In a case where the determined consciousness level of the occupant of the automobile 2 is moderate, the selection button may be presented as the operation information in place of the text input box.

In executing step ST34, the vehicle ECU 31 may generate the inquiry screen assigned with the operation information in the third column, i.e., the minimum input screen, and display the inquiry screen on the vehicle display device 41. The vehicle ECU 31 may repeat the processes of step ST34 to step ST36 to generate, in order, an inquiry screen for presence or absence of injury, an inquiry screen for an injured place, an inquiry screen for a degree of injury, and an inquiry screen for the number of injured, and display the inquiry screens on the vehicle display device 41. The vehicle ECU 31 may refrain from inquiring about the chronic disease and the medical history and the presence or absence of a rescuer by displaying an inquiry screen. In addition, a plurality of selection buttons for the injury inquiry items may be displayed on all of the inquiry screens. In a case where the determined consciousness level of the occupant of the automobile 2 is the lowest, the selection button may be presented as the operation information in place of the text input box.

As described above, in the example embodiment, the vehicle ECU 31 serving as the processor controls the automobile 2 to transmit an emergency report from the mobile communicator 33 to the operator terminal 3 in a case where the automobile 2 is involved in an emergency. After occurrence of the emergency of the automobile 2, the vehicle ECU 31 inquires of the occupant about the injury inquiry item held in the vehicle memory 32 via the vehicle display device 41 and the vehicle operation device 42 serving as the user interface. The vehicle ECU 31 causes the mobile communicator 33 to automatically transmit the inquiry result of the injury to the occupant after the occurrence of the emergency to the operator terminal 3. This enables the operator terminal 3 to automatically obtain, together with the emergency report, the inquiry result of the injury to the occupant after the occurrence of the emergency. The operator is able to check, on the operator terminal 3, injury to the occupant after the occurrence of the emergency, even if the operator is unable to or does not directly inquire about the injury after the occurrence of the emergency by talking by phone with the occupant. Note that the operator may further make a phone call to the occupant to directly inquire about the injury after the occurrence of the emergency in detail. Even if the operator is unable to or does not directly inquire about the injury after the occurrence of the emergency by talking by phone with the occupant, the operator is able to check details and a degree of the emergency before making a dispatch request of a dispatch team, making it possible to request a more appropriate emergency response.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Each of the CPU 11 illustrated in FIG. 2 and the vehicle ECU 31 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 11 and the vehicle ECU 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the CPU 11 illustrated in FIG. 2 and the vehicle ECU 31 illustrated in FIG. 3.

The invention claimed is:

1. A vehicle with an emergency reporting function, the vehicle comprising:

a communicator configured to transmit an emergency report to an operator terminal in a case where the vehicle is involved in an emergency;

a memory configured to hold information on injury inquiry items for inquiry about injury to an occupant of the vehicle;

a user interface provided in the vehicle, the user interface being to be used by the occupant of the vehicle;

a processor configured to control the vehicle to cause the communicator to transmit the emergency report to the operator terminal in the case where the vehicle is involved in the emergency; and an emergency reporting switch provided in the vehicle, the emergency reporting switch being configured receive a manual operation by the occupant, wherein the processor is configured to, in the case where the vehicle is involved in the emergency, inquire of the occupant about the injury inquiry items held in the memory, via the user interface, and cause the communicator to automatically transmit, to the operator terminal, an inquiry result of the injury to the occupant, the memory is configured to hold operation information for the injury inquiry items, and the processor is further configured to:
 make the inquiry by presenting, on the user interface, all pieces of the operation information for all of the injury inquiry items held in the memory, in a case where the emergency is reported by the manual operation; and
 inquire, via the user interface, about some of the injury inquiry items held in the memory for the manual operation or about some pieces of the operation information, in a case where the emergency is not reported by the manual operation.

2. The vehicle with the emergency reporting function, according to claim 1, wherein the processor is configured to, in the case where the vehicle is involved in the emergency, make the inquiry about the injury inquiry items held in the memory, via the user interface, before the communicator transmits the emergency report to the operator terminal.

3. The vehicle with the emergency reporting function, according to claim 2, wherein
 the occupant comprises one or more occupants, and
 the memory is configured to hold the information on the injury inquiry items selected from among how many injured occupants are included in the one or more occupants are injured, presence or absence of injury to each of the injured occupants, an injured place of the each of the injured occupants, a degree of injury of the each of the injured occupants, a chronic disease or a medical history of the each of the injured occupants, and presence or absence of a rescuer for the occupant.

4. The vehicle with the emergency reporting function, according to claim 1, wherein, in the case where the emergency is not reported by the manual operation, the processor is configured to:
 determine presence or absence of consciousness, a consciousness level, or both of the occupant; and
 make the inquiry, via the user interface, about some of the injury inquiry items held in the memory or about some pieces of the operation information, the some of the injury inquiry items or the some pieces of the operation information being increased or reduced in number in accordance with the determined presence or absence of consciousness, consciousness level, or both of the occupant.

5. The vehicle with the emergency reporting function, according to claim 4, wherein the processor is configured to, in a case where the processor determines that the occupant is unconscious, generate unconsciousness information and cause the communicator to transmit the unconsciousness information to the operator terminal, without inquiring about the injury inquiry items held in the memory.

6. The vehicle with the emergency reporting function, according to claim 5, wherein, with a decrease in the determined consciousness level of the occupant, the processor is configured to make the inquiry by reducing in number the some of the injury inquiry items or the some pieces of the operation information to be presented to be selectable for each of the injury inquiry items.

7. The vehicle with the emergency reporting function, according to claim 5, wherein
 the memory is configured to hold a text input box as the operation information for the injury inquiry items in a case where the consciousness level of the occupant is high, and
 the processor is configured to, in a case where the determined consciousness level of the occupant is at least a lowest level, make the inquiry by presenting a selection button, as the operation information, in place of the text input box.

8. The vehicle with the emergency reporting function, according to claim 4, wherein, with a decrease in the determined consciousness level of the occupant, the processor is configured to make the inquiry by reducing in number the some of the injury inquiry items or the some pieces of the operation information to be presented to be selectable for each of the injury inquiry items.

9. The vehicle with the emergency reporting function, according to claim 8, wherein
 the memory is configured to hold a text input box as the operation information for the injury inquiry items in a case where the consciousness level of the occupant is high, and
 the processor is configured to, in a case where the determined consciousness level of the occupant is at least a lowest level, make the inquiry by presenting a selection button, as the operation information, in place of the text input box.

10. The vehicle with the emergency reporting function, according to claim 4, wherein
 the memory is configured to hold a text input box as the operation information for the injury inquiry items in a case where the consciousness level of the occupant is high, and
 the processor is configured to, in a case where the determined consciousness level of the occupant is at least a lowest level, make the inquiry by presenting a selection button, as the operation information, in place of the text input box.

11. The vehicle with the emergency reporting function, according to claim 1, wherein
 the occupant comprises one or more occupants, and
 the memory is configured to hold the information on the injury inquiry items selected from among how many injured occupants are included in the one or more occupants are injured, presence or absence of injury to each of the injured occupants, an injured place of the each of the injured occupants, a degree of injury of the each of the injured occupants, a chronic disease or a medical history of the each of the injured occupants, and presence or absence of a rescuer for the occupant.

12. A vehicle with an emergency reporting function, the vehicle comprising:
- a communicator configured to transmit an emergency report to an operator terminal in a case where the vehicle is involved in an emergency;
- a memory configured to hold information on injury inquiry items for inquiry about injury to an occupant of the vehicle;
- a user interface provided in the vehicle, the user interface being to be used by the occupant of the vehicle; and
- a processor configured to control the vehicle to cause the communicator to transmit the emergency report to the operator terminal in the case where the vehicle is involved in the emergency, wherein
- the processor is configured to, in the case where the vehicle is involved in the emergency, inquire of the occupant about the injury inquiry items held in the memory, via the user interface, and cause the communicator to automatically transmit, to the operator terminal, an inquiry result of the injury to the occupant,
- the occupant comprises one or more occupants, and
- the memory is configured to hold the information on the injury inquiry items selected from among how many injured occupants are included in the one or more occupants are injured, presence or absence of injury to each of the injured occupants, an injured place of the each of the injured occupants, a degree of injury of the each of the injured occupants, a chronic disease or a medical history of the each of the injured occupants, and presence or absence of a rescuer for the occupant.

* * * * *